(No Model.)
A. P. TERRY.
WHEEL.
No. 453,251. Patented June 2, 1891.
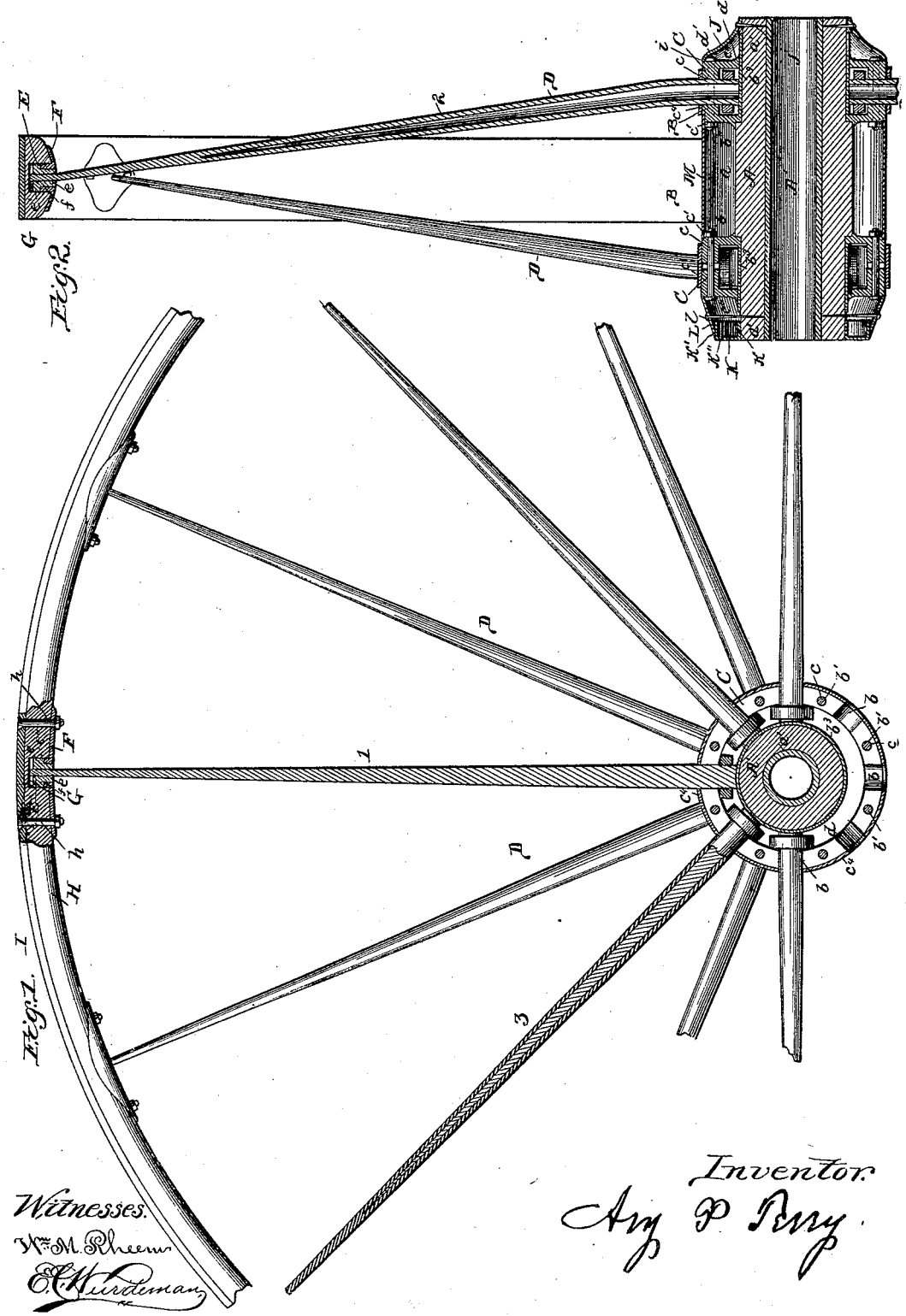
Witnesses.
Wm. M. Rheem
E. C. Wurdeman
Inventor.
A. P. Terry

UNITED STATES PATENT OFFICE.

ARY P. TERRY, OF CHICAGO, ILLINOIS.

WHEEL.

SPECIFICATION forming part of Letters Patent No. 453,251, dated June 2, 1891.

Application filed September 15, 1890. Serial No. 365,100. (No model.)

*To all whom it may concern:*

Be it known that I, ARY P. TERRY, a citizen of the United States, residing at Chicago, in the county of Cook and State of Illinois, have invented certain new and useful Improvements in Wheels; and I do hereby declare that the following is a full, clear, and exact description of the invention, which will enable others skilled in the art to which it pertains to make and use the same, reference being had to the accompanying drawings, forming a part hereof, in which—

Figure 1 is a side elevation, with one of the attaching-rings of the hub in section, and showing also a solid tapering spoke in section and a hollow filled tapering spoke. Fig. 2 is a sectional elevation of one side of a wheel, showing the attachment of the spokes to the hub and rim, and showing a hollow tapering spoke in elevation.

This invention relates to that class of wheels which are termed "suspension-wheels," or wheels having the spokes connected with the rim or felly and entered into the hub, so that by turning the spokes the proper strain can be given to the wheel. The spokes in this class of wheels, when made of light steel of a uniform diameter, have been found defective and unsuitable for the purpose, in that when under strain and subjected to use they are continually breaking at or near the hub, and various attempts have been made to overcome this breaking of the spokes and make a strong and light wheel with steel spokes, none of which have proved successful.

The objects of this invention are to obviate and overcome the defect in the use of steel spokes for wheels of the continually breaking of the spokes and to improve the means for attaching the ends of the spokes to the hub and have the spokes readily adjusted and at the same time locked firmly and securely in place, so as to prevent rattle and displacement, and have the attachment of a nature that will enable a broken or bent spoke to be easily removed and replaced by a new one; and the invention consists in the several parts and combination of parts hereinafter described, and pointed out in the claims as new.

In the drawings, A represents the hub, made of wood or other suitable material, turned or otherwise formed to have a center $a$ and an outer and an inner end $a'$, the two ends, as shown, corresponding in diameter, and the hub has a central longitudinal hole for a box $A'$, as usual.

B is a metal ring, one for each end $a'$ of the hub A and located on each side of the center of the hub. Each ring B can be made of malleable iron or other suitable material, and has on its inner face a series of recesses $b$ of a semicircular shape, as shown, which recesses correspond in number to one-half the number of spokes used in the wheel, and between the recesses $b$ is a series of holes $b'$ for the passage of tightening-bolts $c$, as shown in Figs. 1 and 2. Each ring B has a depending outer wall or flange $b''$, extending out from which is an annular band $b^3$, which band fits tightly around the end $a'$, as shown in Fig. 2, and between the band $b^3$ and the face of the ring B is a recess $d$, as shown in Figs. 1 and 2.

C is a metal ring, one for each end $a'$ of the hub and coacting with a ring B to clasp and retain the ends of the spoke. Each ring C can be made of malleable iron or other suitable material, and its inner face has a series of recesses corresponding to the recesses $b$ of the ring B, and the ring has a series of holes corresponding to the holes $b'$ of the ring B for the passage of the tightening-bolts $c$. Each ring C has a depending outer wall or flange $c''$ with an annular opening to receive the band $b^3$ of the ring B. The tightening-bolts $c$ pass through both rings B and C, and each bolt has a nut $c'$ for drawing the rings together, and the recesses $b$ in each ring B and C are of a less depth than half the diameter of the spoke end which the recesses receive, so that when the spokes are in position and the rings B and C drawn onto the spokes a space $c^3$ will be left between the inner faces of the rings B and C, as shown in Fig. 2, which space $c^3$ prevents any binding between the rings and allows of a take up in case of lateral wear around the recesses, so as to keep the spokes tight. The ring C has an annular peripheral flange $c^4$, which, when the parts are together, fits over the periphery of the ring B, and this flange $c^4$ has a series of openings for the flange to pass the spokes and have its edge overlie the ring B, as shown in Fig. 2, and when the two sets of rings B and C are on the hub they stand in such relation to each other that the spokes of one set of rings come between the spokes of the other set, as shown in Fig. 1.

D are the spokes, made of light steel, and each having a taper from the base or hub end to the tenon or felly end, which taper, as shown, starts from a line above the hub, but could start close to the hub or from the extreme butt-end of the spoke. The spokes shown are cylindrical in cross-section and can have a solid body, as shown by the spoke 1 in Fig. 1, or can have a hollow or tubular body, as shown by the spoke 2 in Fig. 2, or can have a hollow or tubular body with a wood filling D', as shown by the spoke 3 in Fig. 1; but with either form the spoke is to have a tapering shape from the butt-end to the outer end. The butt-end of each spoke, as shown, is screw-threaded and receives a nut $d'$.

E is the head or nut for the outer end of each spoke D, formed of a body $e$ and a flange $e'$ with a lug $e''$ on opposite sides of the body, and having a screw-threaded hole for the end of the spoke.

F is a plate for each head or nut E, each plate having a thimble $f$ with a recess $f'$ on opposite sides, which thimble $f$ receives the body $e$ of the head or nut E, and the recess $f'$ receives the lugs $e''$, and each plate F is attached to the felly by bolts $h$ passing through the felly and tire or rim of the wheel.

G is a recess or hole, one for each head or nut E, formed in the felly and receiving the nut E as a whole and the thimble $f$ of the plate F, and each recess or hole G is of a greater depth than the depth of the head or nut E, so as to leave a space $g$ between the face of the head or nut E and the bottom of the recess or hole to allow the felly to spring inward without striking the spoke end, thereby preventing shocks or concussions on the spokes when the wheel strikes a stone or other hard substance.

H is the felly of the usual construction.

I is the tire or rim through which and the felly the bolts $h$ pass, attaching the tire or rim to the felly and fastening the plates F in place.

J is a metal shell for finishing the front end of the hub, and having an edge $i$ abutting against the ring C and encircling the end $a'$, and secured in place by nails or screws $j$, driven or entered into the hub.

K is a band encircling the inner end of the hub and formed of malleable iron or other suitable material to have an inner ring $k$, fitting around the end $a'$, an outer ring $k'$, and a connecting-wall $k''$, leaving a channel between the inner and outer rings, as shown in Fig. 2.

L is a metal shell for finishing the inner end of the hub, abutting at its inner edge against the ring C and encircling the ring $k'$ of the band K, and held in place by nails or screws $l$, driven or entered into the hub.

M is a band for finishing the center of the hub and supported by and between the rings B by having its end enter a recess in the periphery of the ring.

The wheel is put together by placing the heads or nuts E in the holes G therefor in the felly H, entering the thimble $f$ of the plate F into the hole G to receive the body $e$ of the head or nut E and have the lugs $e''$ engage the notches $f'$, securing the plates F in position by the bolts $h$ and screwing the outer ends of the spokes D into their respective heads or nuts E. The rings B are driven or forced onto the ends $a'$ for the bands $b^3$ to encircle and fit snugly around the ends of the hub and have the openings or recesses $b$ of the two bands alternate. The butt-ends of each alternate spoke D are entered into a recess $b$ of the front and rear rings B and a nut $d'$ placed in the channel $d$ and screwed onto the end of each spoke D, drawing the spokes to place in the rings B. The rings C are slipped onto the bands $b^3$ at the front and rear of the hub for the spokes D to enter the openings $b$ of the respective rings C. The bolts $c$ are passed through the rings B and C and the nuts $c'$ entered on the bolts $c$ and screwed down, drawing the rings B and C together and securing the butt-ends of the spokes to the hub. The shell J is slipped onto the front end of the hub to abut against the ring C and secured by the nails or screws $l$, the band K is driven or forced onto the inner end of the hub, and the shell L is slipped onto the band K to abut against the ring C and is secured by the nails or screws $l$, and the band M is placed around the center of the hub between the rings B, completing the assembling of the wheel, and when the wheel is assembled the necessary strain is placed thereon by turning the spokes D, each as required, for the end to enter its head or nut E, and such turning is had by the interlocking of the head or nut E to the plate F by the engagement of the lugs $e''$ and notches $f'$.

The band $b^3$, formed with the ring B and encircling and fitting snugly around the end $a'$ of the hub, gives the ring B a firm and strong support, and also furnishes additional strength for the hub, and as this band $b^3$ receives and carries the ring C it will be seen that the ring C must also have a firm and strong support, and when the two rings are united by the bolts $c$ and drawn around the butt-end of the spokes the spokes will be clasped and firmly held at the butt-end, so as not to have any rattle, and in case a rattle occurs it can be easily stopped by inserting a piece of leather or other filling around the spoke in the recess $b$, and the flange $c^i$, encircling the ring B, gives additional support for the ring C and forms a guard against the admission of dirt around the spoke.

A spoke can be easily removed and replaced for repair or other purpose, as all that is required is to remove the guard or finishing band for the hub, remove the nuts $c'$ from the bolts $c$, and withdraw the ring C, when the nut $d'$ can be released and the spoke or spokes removed by unscrewing the outer end from the head or nut E, and when removed the outer end of the new spoke can be screwed into the head or nut E and its butt-end inserted in the recess $b$ and the nut $d'$ screwed onto the butt-end. The ring C is then replaced and secured by the bolts $c$ and the finishing-bands applied, making the repairs and leaving the wheel in perfect condition, the spoke or spokes being tightened or strained, as before described.

The breakage of light steel spokes at the hub in suspension-wheels arises from the constant bending of the spokes from the swing of the rim. The steel spokes heretofore used in this class of wheels are of a uniform size from end to end and are firmly secured at both the hub and tire end, the result being that when the rim of the wheel vibrates or swings sidewise, as it must in the running of a wheel on a road, the spokes must have a corresponding movement, and as the spokes are all strung taut and under strain they cannot curve, but must draw straight and must of necessity bend at the hub end, and although this bending is only slight it is a constant bending back and forth, which must produce a fracture of the metal in time, and then a breakage of the spoke occurs, and as such breakage in nearly every case is at the hub it shows conclusively that there is a constant abrupt bending of the spoke at this point. It is to remedy this bending of the spoke at the hub end and consequent breaking that the spokes D are made tapering from the butt-end to the rim end. This construction of spoke gives an increased resistance at the hub against bending at that point, and in the swing of the rim the spoke is free to curve its whole length by reason of the taper, which removes any possibility of an abrupt or any bend at the hub, as the bend will be a gradual one over the whole length of the spoke and cannot be concentrated at any one point, the result being that the spoke flexes from the hub to the rim, and such flexing or bending cannot impair or injure the spoke, as it is not of a nature to produce or cause a fracture, but simply curves the spoke without injury, and the spring will always bring the spoke back to its normal condition.

The tapering spoke D, whether with a solid body or a hollow body, or a hollow body filled, will have the quality of curving its entire length without any abrupt bending at the hub end, and by using a hollow spoke a greater resistance is had proportionate to the size of the spoke, and with a hollow-filled spoke the vibration, if any there should be, will be effectually stopped or prevented, as the filling will act and prevent the transmission of vibrations from the rim to the hub.

What I claim as new, and desire to secure by Letters Patent, is—

1. The hub A, having the ends $a'$, in combination with the spoke-attaching ring B, having the band $b^3$ and a half receiving-chamber for a spoke-tightening nut, and spoke-attaching ring C, fitting onto the band $b^3$, and having a half receiving-chamber for a tightening-nut for clamping spokes to a wheel-hub, substantially as and for the purposes specified.

2. The spoke-attaching ring B, having spoke-receiving recesses $b$ of a less depth than half the spoke diameter, and band $b^3$, in combination with the spoke-attaching ring C, having spoke-receiving recesses of a less depth than half the spoke diameter and fitting over the band $b^3$, substantially as and for the purposes specified.

3. The spoke-attaching ring B, having spoke-receiving recesses $b$ of a less depth than half the spoke diameter, and bolt-holes $b'$ and band $b^3$, in combination with the spoke-attaching ring C, having spoke-receiving recesses of a less depth than half the spoke diameter and bolt-holes, and the tightening-bolts $c$, substantially as and for the purposes specified.

4. The spoke-attaching ring B, having spoke-receiving recesses $b$ of a less depth than half the spoke diameter, band $b^3$, and annular channel $d$, forming a half-chamber for receiving the spoke-nut, in combination with the ring C, having spoke-receiving recesses of a less depth than half the spoke diameter, and annular channel forming a half-chamber for receiving the spoke-nut, substantially as and for the purposes specified.

5. The spoke-attaching ring B, having spoke-receiving recesses $b$ of a less depth than half of the spoke diameter, bolt-holes $b'$, band $b^3$, and annular channel $d$, forming a half-chamber for receiving a spoke-nut, in combination with the spoke-attaching ring C, having spoke-receiving recesses of a less depth than half of the spoke diameter, bolt-holes, and annular channel forming a half-chamber for receiving the spoke-nut and bolts $c$, substantially as and for the purposes specified.

6. A light steel spoke for a wheel, formed tapering from its base to its outer end for flexing the spoke its whole length and for preventing abrupt bending of the spoke at any one point and consequent breaking of the spoke, substantially as specified.

7. The combination, in a wheel, of a series of light steel spokes, each formed tapering from its base outward, whereby the swing of the wheel-rim will curve the spokes the whole length and not bend them at one point, substantially as and for the purposes specified.

8. The hub A, having the ends $a'$, rings B, having spoke-receiving recesses $b$ and band $b^3$, and rings C, having spoke-receiving recesses, in combination with the light steel spokes D, tightly clamped at the butt-ends between the rings B and C in the spoke-receiving recesses of the rings, substantially as and for the purposes specified.

9. The hub A, having the ends $a'$, rings B, having spoke-receiving openings $b$, bolt-holes $b'$, band $b^3$, and annular channel $d$, and rings C, having spoke-receiving recesses, bolt-holes, and annular channel, in combination with the light steel spokes D, each tapering from the butt-end outward, bolts $c$, and nuts $d$ for tightly clamping the butt-ends of the spokes, substantially as and for the purposes specified.

10. The tapering spoke D, of light steel, and head or nut E, formed of a body $e$ and a flange $e'$ and having lugs $e''$, in combination with the plate F, having the thimble $f$ and notches $f'$, receiving the lugs $e''$ for attaching the spoke to the felly and allowing an inward spring of the felly without affecting the spoke, substantially as and for the purposes specified.

11. The hub A, having the end $a$, and ring B, in combination with the band K, encircling the hub end, and shell L, having a downward inclination from the ring B to the band K for covering and finishing the rear end of a wheel-hub, substantially as specified.

ARY P. TERRY.

Witnesses:
O. W. BOND,
W. R. HUBBARD.